(12) United States Patent
Suzuki et al.

(10) Patent No.: US 7,252,462 B2
(45) Date of Patent: Aug. 7, 2007

(54) SPINDLE UNIT HAVING PRESSURE FOOT

(75) Inventors: Nobuhiko Suzuki, Ebina (JP); Yasushi Ito, Ebina (JP); Shinji Tanaka, Ebina (JP)

(73) Assignee: Hitachi Via Mechanics, Ltd., Kanagawa-ken (JP)

( * ) Notice: Subject to any disclaimer, the term of this patent is extended or adjusted under 35 U.S.C. 154(b) by 366 days.

(21) Appl. No.: 10/935,192

(22) Filed: Sep. 8, 2004

(65) Prior Publication Data

US 2005/0053434 A1 Mar. 10, 2005

(30) Foreign Application Priority Data

Sep. 9, 2003 (JP) .............. 2003-317494

(51) Int. Cl.
*B23B 41/00* (2006.01)
(52) U.S. Cl. .......................... 408/95; 408/98
(58) Field of Classification Search .................. 408/95, 408/98, 67; 409/137, 135–136
See application file for complete search history.

(56) References Cited

U.S. PATENT DOCUMENTS

| 4,088,417 A | * | 5/1978 | Kosmowski ............... 408/1 R |
| 4,932,117 A | | 6/1990 | Reed et al. |
| 4,984,352 A | | 1/1991 | Reed et al. |
| 5,078,558 A | | 1/1992 | Arai et al. |
| 5,108,236 A | | 4/1992 | Arai et al. |
| 5,123,789 A | | 6/1992 | Ohtani et al. |
| 5,147,160 A | | 9/1992 | Reed et al. |
| 5,539,966 A | * | 7/1996 | Aufiero ..................... 29/26 A |
| 5,893,687 A | * | 4/1999 | Oketani et al. ............. 408/97 |
| 6,015,249 A | * | 1/2000 | Sacchetti ..................... 409/186 |
| 2002/0104207 A1 | | 8/2002 | Smith et al. |

FOREIGN PATENT DOCUMENTS

| JP | 59205209 A | * | 11/1984 |
| JP | 61095806 A | * | 5/1986 |
| JP | 62-107903 | | 5/1987 |
| JP | 10-29133 | | 2/1998 |
| JP | 2000-5910 | | 1/2000 |

* cited by examiner

*Primary Examiner*—Daniel W. Howell
(74) *Attorney, Agent, or Firm*—Wenderoth, Lind & Ponack, L.L.P.

(57) ABSTRACT

A spindle unit having a pressure foot whose machining efficiency may be improved even when compressed air is used as means for pressing the pressure foot. The spindle unit having the pressure foot includes a rotor shaft provided within a base rotatably and movably along an axis, a collet chuck provided at one end of the rotor shaft, a linear motor for moving a movable element rotatably connected with the rotor shaft and movably provided within the base along the axis together with the rotor shaft to move a drill closer to or apart from the workpiece, a rotary motor for rotating the rotor shaft, a pressure foot disposed in front of the edge of the collet chuck and is capable of pressing down the workpiece, and air cylinders for connecting the movable element with the pressure foot so as to be relatively movable by a predetermined degree and for pressing the pressure foot in the direction separating from the collet chuck.

4 Claims, 3 Drawing Sheets

SPINDLE UNIT HAVING PRESSURE FOOT

BACKGROUND OF THE INVENTION

1. Field of the Invention

The present invention relates to a spindle unit having a pressure foot for machining workpieces while pressing down the workpieces to a table by the pressure foot.

2. Description of Related Art

Hitherto, there has been a motor built-in type spindle unit whose machining efficiency is enhanced by increasing a moving speed of a drill, i.e., a machining tool, as disclosed in Japanese Patent Laid-open No. 62-197903 for example. This spindle unit is arranged so as to increase the drill moving speed, i.e., a machining speed, by moving up and down only a rotor shaft i.e., a spindle retaining the drill, in machining workpieces by rotatably and movably supporting the rotor shaft by a housing, i.e., a body portion of the unit. This arrangement allows not only the moving speed to be increased but also vibration occurring in machining to be reduced.

By the way, the prior art spindle unit allows a hole to be made accurately at predetermined position by drilling a workpiece while pressing down a peripheral part of the workpiece to be machined by a pressure foot, i.e., pressure foot means, for pressing the workpiece to a table.

However, the prior art spindle unit having the pressure foot has required other driving means for moving the pressure foot in addition to driving means for moving the rotor shaft so as to be able to move the pressure foot and the rotor shaft separately in machining workpieces. In this case, the driving means of the pressure foot has also played a role of pressing means for pressing the pressure foot to the workpiece and it has been difficult to increase the machining efficiency when compressed air is used for the pressing means because its response is slow in switching the pressing direction.

SUMMARY OF THE INVENTION

It is an object of the invention to provide a spindle unit having a pressure foot whose machining efficiency can be improved even when compressed air is used for a pressing means.

An inventive spindle unit having a pressure foot comprises:
a body;
a spindle provided rotatably within the body and movably along an axis;
retaining means (collet chuck) provided at one end of the spindle for removably retaining a machining tool for machining workpieces;
holding means (vertical connecting shaft and movable element) rotatably connected with the spindle and provided within the body movably along the axis;
linear driving means (linear motor) for moving the holding means together with the spindle along the axis to move the machining tool closer to or apart from the workpiece;
rotary driving means (rotary motor) provided within the body for rotating the spindle;
pressure foot means (pressure foot) disposed in front of the edge of the spindle for pressing down the workpiece; and
pressing means (air cylinder) for connecting the holding means with the pressure foot means so as to be relatively movable by a predetermined degree and for pressing the pressure foot means in the direction separating from the edge of the spindle.

Since the spindle unit having the pressure foot is arranged so that the common linear driving means (linear motor) moves the spindle and the pressure foot means that is connected with the holding means through an intermediary of the pressing means (air cylinder), the pressure foot means may be moved quickly in synchronism with the spindle, thus increasing the workability. Still more, since the pressing means always presses the workpiece by a predetermined pressure during operation, it is possible to prevent the machining tool such as the drill from being damaged. This arrangement also allows the structure of the unit to be simplified and downsized.

Preferably, the spindle unit having the pressure foot is also provided with resilient means (spring) between the body and the holding means (link plate connected in a body with movable element) to force the holding means in the direction of separating the edge of the spindle and the pressure foot means (pressure foot) from the workpiece.

This arrangement prevents the spindle and the pressure foot means from dropping by their own weight and damaging the workpiece or the machining tool, even when the linear driving means (linear motor) is not in operation.

Preferably, the spindle unit having the pressure foot is constructed so that a part of the body supporting the spindle is separable in the direction crossing with the direction of the axis.

This arrangement enables a worn-out spindle to be replaced readily and swiftly.

The specific nature of the invention, as well as other objects, uses and advantages thereof, will clearly appear from the following description and from the accompanying drawings.

BRIEF DESCRIPTION OF THE DRAWINGS

FIGS. 3A and 3B are section views taken along A-A in FIG. 2, wherein FIG. 3A shows a state in which a spindle is put into a base and FIG. 3B shows a state in which the spindle is taken out of the base.

DETAILED DESCRIPTION OF THE INVENTION

Figure 1:
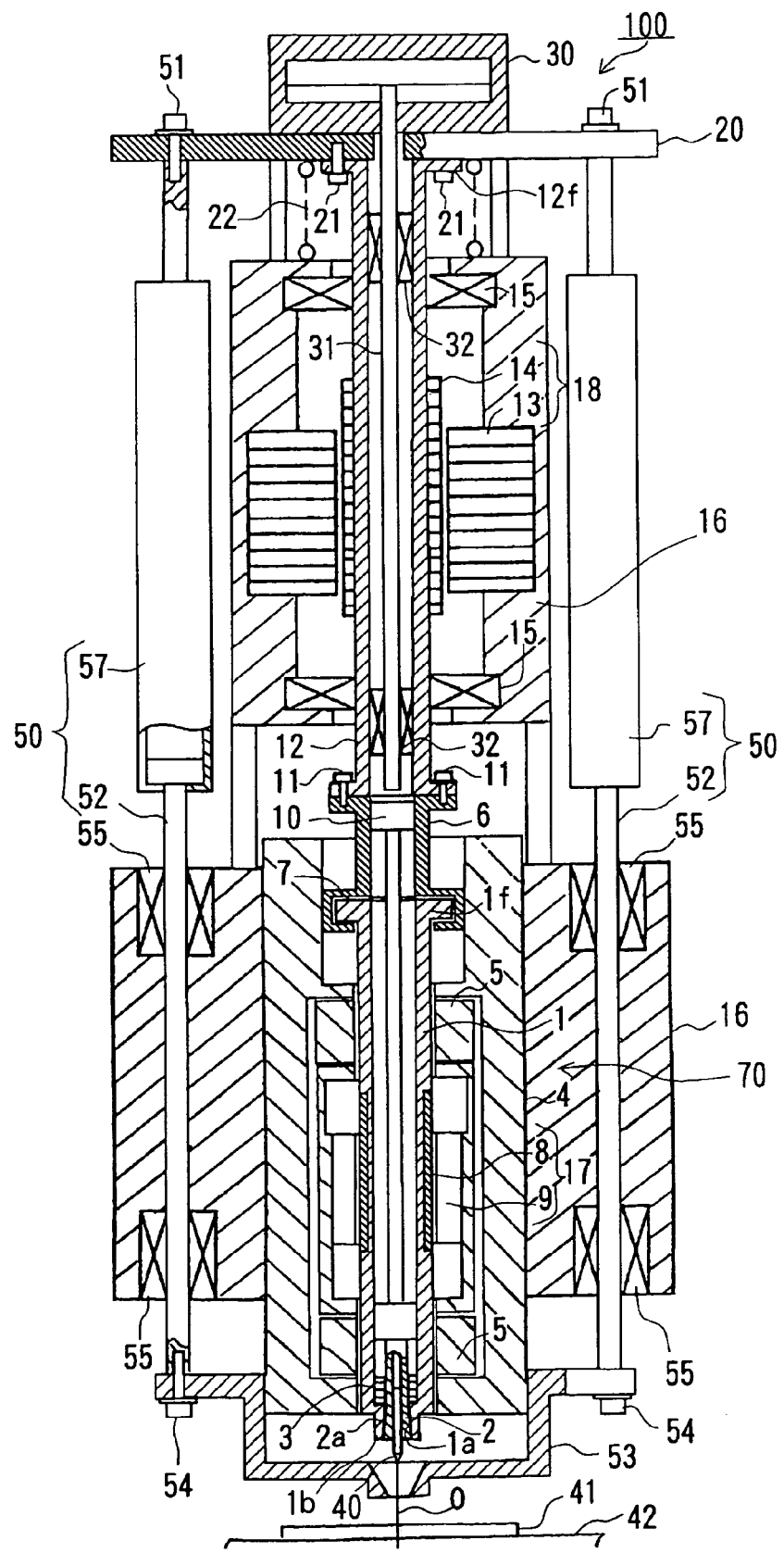
FIG. 1 is a front view, partly in section, of a spindle unit having a pressure foot according to an embodiment of the invention.

A spindle unit having a pressure foot of a preferred embodiment of the invention will be explained with reference to the drawings wherein like reference characters designate like or corresponding parts throughout the several views.

FIG. 1 is a front view, partly in section, of the spindle unit 100 having the pressure foot of the embodiment.

Disposed at the edge 1b of a spindle (hereinafter referred to as a rotor shaft) 1 of the spindle unit 100 are a collet chuck 2 and a spring 3 for forcing the collet chuck 2 upward in the figure. The collet chuck 2 has a plurality of slits (not shown) on the side of a drill 40 along an axis O, i.e., a rotational center axis of the rotor shaft 1, so that its diameter can be reduced radially.

The drill 40 is retained by the collet chuck 2, i.e., retaining means, by a radial force which is produced when the spring 3 pulls up the collet chuck 2 and a tapered face 1a formed at the inner face of the rotor shaft 1 presses a tapered face 2a formed around the outer periphery of the collet chuck 2.

The rotor shaft 1 is supported radially by a plurality of radial air bearings 5 disposed within a housing 4 and is supported and positioned in the direction along the axis O by a thrust air bearing 7 in which a flange 1f at its end is formed in a vertical connecting shaft 6.

A rotor 8 that is formed of an end-ring copper member is disposed around the rotor shaft 1. A coil (stator) 9 is disposed on a face facing to the coil 8 within the housing 4. The rotor 8, i.e., the rotor shaft 1, rotates when electricity is fed through the coil 9. Thus, the coil 9 and the rotor 8 constitute a rotary motor 17, i.e., rotary driving means.

A pressure rod 10 is disposed above the collet chuck 2. The pressure rod 10 is movable within the rotor shaft 1 along the axis O. The housing 4 is fixed to a base 16. The housing 4 and the base 16 constitute a body portion of the unit.

The vertical connecting shaft 6 is connected with a movable element 12 by means of bolts 11. The vertical connecting shaft 6 and the movable element 12 constitute the holding means. Disposed on the side of the movable element 12 is a magnet 14 that constitutes a linear motor 18 together with a coil 13. The coil 13 is disposed in the base 16 facing to the magnet 14. The movable element 12 moves along the axis O when electricity is supplied to the coil 13. It is noted that while the linear motor 18 constitutes the linear driving means, not only the linear motor 18 but also other linear driving means such as a hydraulic cylinder may be used.

Bearings 15 support the movable element 12 so as to be movable within the base 16 along the axis O. The movable element 12 is connected in a body with a link plate 20 by fixing a flange 12f provided at the upper end of the movable element 12 to the link plate 20 by means of bolts 21. A spring 22, i.e., resilient means, is interposed between the link plate 20 and the base 16 to force the link plate 20 upward in the figure.

A cylinder 30 is disposed above the base 16. Guides 32 support a rod 31 of the cylinder 30 so that the rod 31 moves along the axis O. The guides 32 are provided within the movable element 12. When the rod 31 stays at the upper end, the edge (lower end) of the rod 31 separates from the upper end of the pressure rod 10.

A pair of air cylinders 50 is fixed to the link plate 20 by means of bolts 51. A pressure foot 53 is fixed to rods 52 of the air cylinders 50 by means of bolts 54. The rods 52 are arranged so as to move in and out of the air cylinders 50. The air cylinder 50 is arranged so that air is charged/discharged from the both sides. The link plate 20, the air cylinders 50 and the pressure foot 53 move in a body when the movable element 12 is moved. However, the pressure foot 53 moves up and down separately from the link plate 20 when the direction of air to be charged to the air cylinders 50 is changed. Guides 55 retained in the base 16 support the rod 52 so as to be movable along the axis O. Air is supplied to the air cylinder 50 so that downward pressure always acts on the piston rod 52 during machining operation. The air cylinders 50 constitute the pressing means.

Next, an operation of the spindle unit 100 having the pressure foot of the embodiment will be explained.

At first, steps for attaching/detaching the drill 40 will be explained.

The cylinder 30 is operated in replacing the drill 40. When the rod 31 is lowered, the pressure rod 10 moves the collet chuck 2 downward in the figure as against the force of the spring 3. When the tapered face 2a of the collet chuck 2 separates from the tapered face 1a of the rotor shaft 1, the force of the collet chuck 2 retaining the drill 40 is eliminated, thus detaching the drill 40 from the collet chuck 2. Then, a new drill 40 is inserted into the inside of the collet chuck 2 in this state and the rod 31 is moved up to cause the collet chuck 2 to retain the new drill 40.

Next, a machining operation of the spindle unit 100 having the workpiece pressure foot of the embodiment will be explained.

In starting to machine workpieces, the air cylinders 50 press the pressure foot 53, i.e., the pressure foot means, downward in the figure by air within the cylinders 57. Then, after positioning the axis O to the machining spot, electricity is fed to the coil 13 to lower the link plate 20 as against the force of the spring 22 until when the edge (chisel edge) of the drill 40 reaches to predetermined position. As the link plate 20 is lowered, the pressure foot 53 and the rotor shaft 1 start to move down together. Then, when the pressure foot 53 contacts with the workpiece 41 by its lower end, it stops from descending, presses down the workpiece 41 and relatively rises in relation to the rotor shaft 1 that continues to descend. During this time, the pressure foot 53 and the link plate 20 compress the air cylinders 50 that absorbs the relative movements of the pressure foot 53 and the rotor shaft 1. It is noted that the predetermined air pressure is always supplied to the cylinder 57 and the pressure foot always presses the workpieces with equal pressure even when the operation for drilling the workpieces advances and a distance between the pressure foot 53 and the edge 1b of the rotor shaft 1 changes. It is also possible to keep the cylinder 57 to have the predetermined pressure by closing a valve while supplying the predetermined air pressure to the cylinder 57.

When the drill 40 opens a hole through the workpiece 41 to a desirable depth by its edge, the direction of the current fed to the coil 13 is reversed to raise the link plate 20 by the linear motor 18, i.e., linear driving means. Here, the pressure foot 53 is pressed downward by the air cylinder 50. Therefore, the drill 40 is pulled out of the workpiece 41 at first and then the pressure foot 53 separates from the workpiece 41.

Because the movable element 12, the link plate 20, the air cylinders 50, the pressure foot 53, the rotor shaft 1 and the drill 40 are linked together in the ascending/descending direction in the operation described above, the link plate 20, the air cylinders 50, the pressure foot 53 and others descend together 41 when the link plate 20 is lowered by the linear motor 18, allowing the pressure foot 53 to press the workpiece without controlling air to the air cylinders 50. Accordingly, the pressure foot 53 may be lowered simultaneously and quickly with the movable element 12 and the link plate 20 without controlling electromagnetic valves (not shown) connected to the air cylinders 50 to control the flow of air, thus improving the efficiency of drilling works.

Still more, it is possible to raise the link plate 20, the air cylinders 50, the pressure foot 53 and others together in the state in which air is supplied to the air cylinders 50 in raising the link plate 20 by the linear motor 18 after ending the drilling work. In this case, the pressure foot 53 rises together because a piston of the piston 52 abuts against the bottom face of the cylinder 57. However, when they start to rise, the pressure foot 53 is late to rise. In this case, it is also possible to separate the pressure foot 53 from the workpiece 41 sooner and to transfer to the next drilling work by supplying air to the opposite side of the air cylinders 50 to move the pressure foot 53 in the direction separating from the workpiece 41.

According to the present embodiment, the pressure foot 53 and the rotor shaft 1 are operated by the linear motor 18, i.e., the common driving source, through the intermediary of the link plate 20, so that the both may be moved in synchronism without providing any special means.

It is noted that although the magnet 14 has been disposed on the side face of the movable element 12 in the embodiment described above, it is not necessary to provide the magnet 14 when the movable element 12 is made from a magnetic material such as iron.

By the way, while a spindle body 70 needs to be replaced because it is a consumable item, the spindle unit 100 of the present embodiment is constructed so as to be able to readily replace the spindle body 70. The spindle body 70 comprises the rotor shaft 1, the housing 4 and the vertical connecting shaft 6. The spindle body 70 also includes the collet chuck 2, the spring 3 and the rotor 8 built in the rotor shaft 1, the radial air bearings 5 and the coil 9 built in the housing 4 and thrust air bearing 7 formed in the vertical connecting shaft 6.

Figure 2:
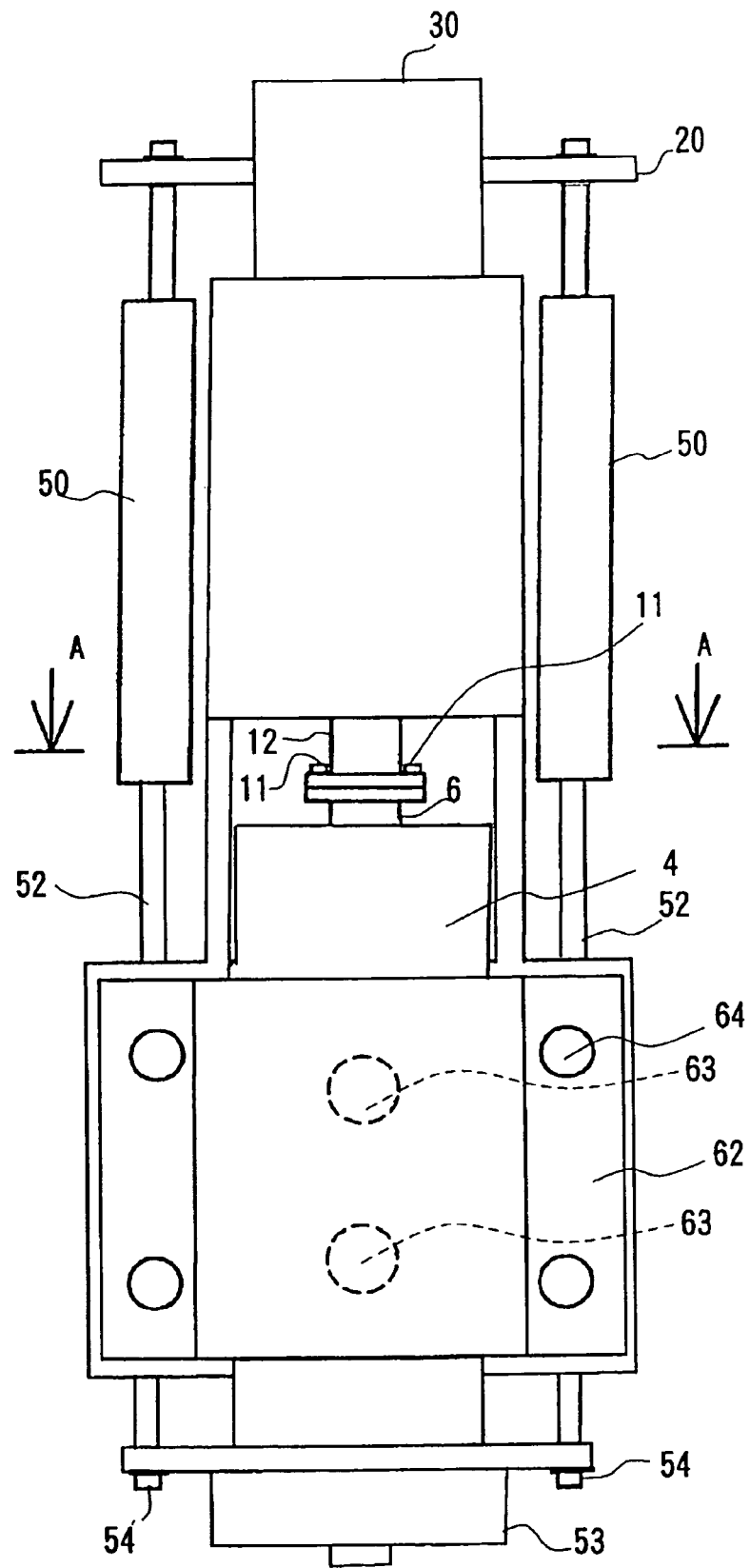
FIG. 2 is a front view of a spindle unit having a pressure foot of the embodiment.
Figure 3A:
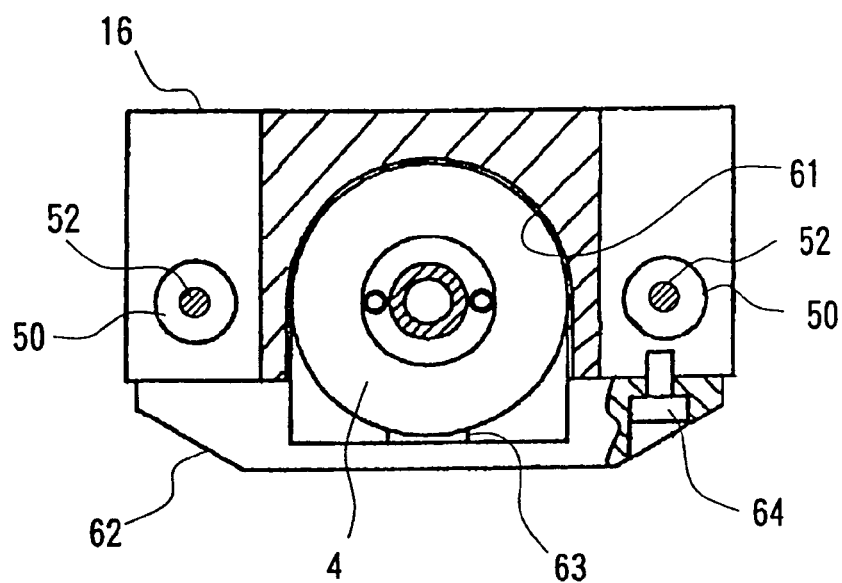
Figure 3B:
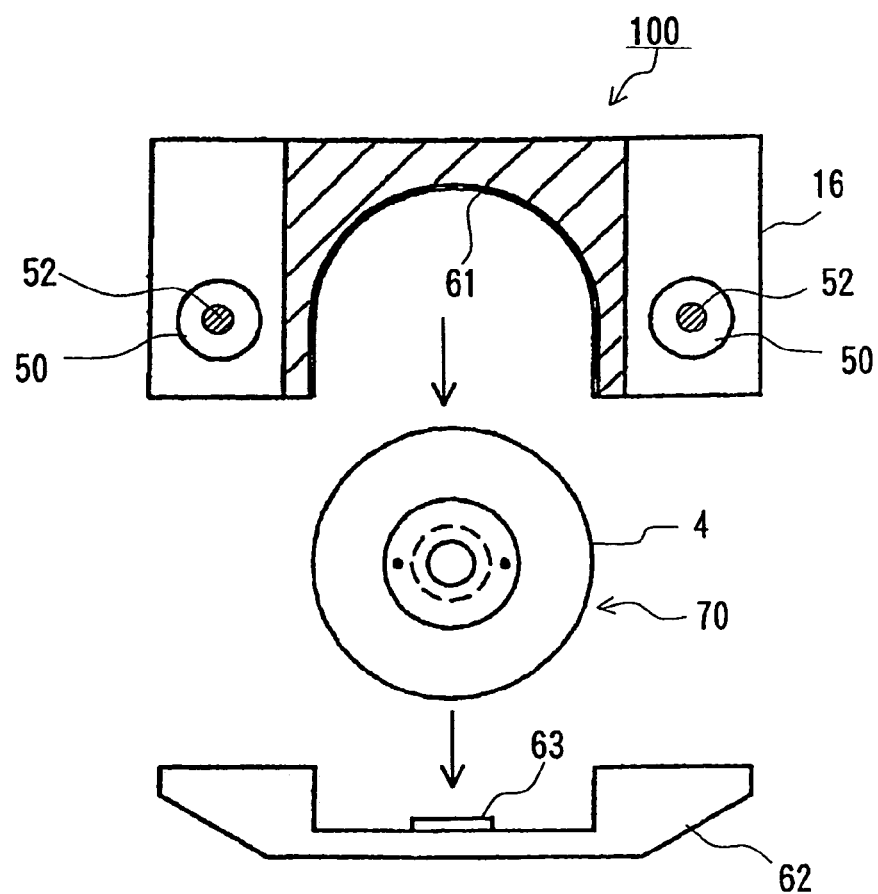

FIG. 2 is a front view of the spindle unit 100 of the embodiment and FIGS. 3A and 3B are section views taken along A-A in FIG. 2, wherein FIG. 3A shows a state in which the spindle body is put into the base, and FIG. 3B shows a state in which the spindle body is taken out of the base.

The housing 4 fits in a U-shaped notch 61 formed in the base 16 and is fixed to the base 16 by a bowl-shaped cover 62 through an intermediary of pressure rubbers 63. Two pressure rubbers 63 are disposed along the axis O and are compressed between the cover 62 and the housing 4 when the cover 62 is fixed to the base 16 by means of bolts 64, thus pressing the housing 4 to the base 16 by its resilience.

Because the spindle unit 100 is constructed as described above, the spindle body 70 may be removed out of the base 16 readily as shown in FIG. 3B by unscrewing the bolts 64 while unscrewing the bolts 11 and by removing the cover 62 from the base 16. Accordingly, it is possible to replace the spindle body or to maintain the inside of the unit readily.

It is noted that in this case, it becomes easier to replace them by removing the pressure foot 53 in advance.

While the preferred embodiments have been described, variations thereto will occur to those skilled in the art within the scope of the present inventive concepts, which are delineated by the following claims.

What is claimed is:

1. A spindle unit having a pressure foot, comprising:
a body;
a spindle mounted rotatably within said body and movably along an axis;
retaining means mounted at one end of said spindle for removably retaining a machining tool for machining workpieces;
holding means rotatably connected with said spindle and provided within said body movably along the axis;
linear driving means for moving said holding means together with said spindle along the axis to move said machining tool closer to or apart from the workpiece;
rotary driving means provided within said body for rotating said spindle;
pressure foot means disposed forward of an edge of said spindle for pressing down the workpiece;
pressing means for connecting said holding means and said pressure foot means so as to be relatively movable by a predetermined degree and for pressing said pressure foot means in a forward direction; and
resilient means provided between said body and said holding means for forcing said holding means in a rearward direction, the rearward direction being opposed to the forward direction.

2. The spindle unit having the pressure foot as set forth in claim 1, wherein a part of said body supporting said spindle is separable along a line crossing with the direction of the axis.

3. The spindle unit having the pressure foot as set forth in claim 1, wherein said retaining means is a collet chuck;
said holding means is a vertical connecting shaft rotatably connected with said spindle in the axial direction and a movable element connected with said vertical connecting shaft;
said linear driving means is a linear motor for moving said movable element along the axis;
said rotary driving means is a rotary motor;
said pressure foot means is a pressure foot; and
said pressing means is an air cylinder interposed between said movable element and said pressure foot.

4. A spindle unit having a pressure foot, comprising:
a body;
a spindle mounted rotatably within said body and movably along an axis;
a retainer mounted at one end of said spindle for removably retaining a machining tool for machining workpieces;
a holder rotatably connected with said spindle and provided within said body movably along the axis;
a linear motor for moving said holder together with said spindle along the axis to move said machining tool closer to or apart from the workpiece;
a rotary motor provided within said body for rotating said spindle;
a pressure foot disposed forward of an edge of said spindle for pressing down the workpiece;
a pressurized cylinder for connecting said holder and said pressure foot so as to be relatively movable by a predetermined degree and for pressing said pressure foot in a forward direction; and
a resilient member provided between said body and said holder for forcing said holder in a rearward direction, the rearward direction being opposed to the forward direction.

* * * * *